United States Patent
Henry et al.

(10) Patent No.: US 7,240,163 B2
(45) Date of Patent: *Jul. 3, 2007

(54) MICROPROCESSOR, APPARATUS AND METHOD FOR SELECTIVE PREFETCH RETIRE

(75) Inventors: Glenn Henry, Austin, TX (US); Rodney Hooker, Austin, TX (US)

(73) Assignee: IP-First, LLC, Fremont, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 11/198,988

(22) Filed: Aug. 8, 2005

(65) Prior Publication Data

US 2005/0278485 A1 Dec. 15, 2005

Related U.S. Application Data

(63) Continuation of application No. 10/420,357, filed on Apr. 21, 2003, now Pat. No. 6,990,558.

(60) Provisional application No. 60/390,054, filed on Jun. 18, 2002.

(51) Int. Cl.
*G06F 12/00* (2006.01)

(52) U.S. Cl. .............. 711/137; 711/118; 711/128; 711/204; 711/213; 712/207; 712/237

(58) Field of Classification Search ............... None
See application file for complete search history.

(56) References Cited

U.S. PATENT DOCUMENTS

| 6,138,213 A | 10/2000 | McMinn |
| 6,219,760 B1 | 4/2001 | McMinn |
| 6,523,093 B1 | 2/2003 | Bogin et al. |
| 2002/0129205 A1 | 9/2002 | Anderson et al. |

*Primary Examiner*—Jasmine Song
(74) *Attorney, Agent, or Firm*—E. Alan Davis; James W. Huffman

(57) ABSTRACT

An apparatus in a microprocessor for selectively retiring a prefetched cache line is disclosed. In a first embodiment, a first count of the number of accesses to the prefetched cache line and N second counts of the number of accesses to N lines of a replacement candidate set of the cache selected by the prefetched cache line address are maintained. When another prefetch is requested, if the first count is greater than the smaller of the N second counts, the candidate prefetched cache line is retired into the cache; otherwise the prefetched cache line is discarded. In a second embodiment, a count of accesses to the replacement candidate line is maintained. When another prefetch is requested, if the count is greater than a programmable threshold value, the candidate prefetched cache line is retired into the cache; otherwise the prefetched cache line is discarded.

36 Claims, 4 Drawing Sheets

*Microprocessor with Apparatus for Selectively Retiring Prefetched Cache Line (Alternate Embodiment)*

Microprocessor with Apparatus for Selectively Retiring Prefetched Cache Line

Selective Prefetch Retire Operation

*Microprocessor with Apparatus for Selectively Retiring Prefetched Cache Line (Alternate Embodiment)*

Selective Prefetch Retire Operation (Alternate Embodiment)

MICROPROCESSOR, APPARATUS AND METHOD FOR SELECTIVE PREFETCH RETIRE

PRIORITY INFORMATION

This application is a continuation of application Ser. No. 10/420,357, filed Apr. 21, 2003 now U.S. Pat. No. 6,990,558.

This application claims priority based on U.S. Provisional Application, Ser. No. 60/390,054, filed Jun. 18, 2002, entitled METHOD FOR SELECTIVE PREFETCH RETIRE.

FIELD OF THE INVENTION

This invention relates in general to the field of cache memories, and particularly to cache line prefetching.

BACKGROUND OF THE INVENTION

Modern computer systems include a microprocessor and a system memory for storing instructions to be executed by the microprocessor and data to be processed by the instructions. The time required to read data from the system memory is typically very large relative to the time the microprocessor spends executing one or more instructions to process the data—in some cases one or two orders of magnitude. Consequently, the processor may sit idle while the data is loaded from the system memory, which is very inefficient and degrades system performance.

To alleviate this problem, microprocessors include a cache memory. A cache memory is a memory within the processor smaller than the system memory that stores a subset of the system memory data. When the processor executes an instruction that references data, the processor first checks to see if the data is present in the cache, commonly referred to as a "cache hit," from a previous load of the data. If the load hits in the cache, then the instruction can be executed immediately. Otherwise, if the load "misses" the cache, the instruction must wait while the data is fetched from the system memory into the processor.

Microprocessor designers have recognized that software programs frequently access data and instructions sequentially. Hence, if a load misses in the cache, it is highly likely that the data at the memory addresses following the load miss address will be requested by the program in the near future. Consequently, a microprocessor may speculatively begin loading the next chunk of data after the missing data into the cache, even though the program has not yet requested the next data, in anticipation of a future need for the next chunk of data. This is commonly referred to as a prefetch.

The chunk of data prefetched is commonly the size of a cache line. Caches store data in cache lines. Common cache line sizes are 32 bytes or 64 bytes. A cache line is the smallest unit of data that can be transferred between the cache and the system memory. That is, when a microprocessor wants to read a cacheable piece of data missing in the cache, it reads from memory the entire cache line containing the missing piece of data and stores the entire cache line in the cache. Similarly, when a new cache line needs to be written to the cache that causes a modified cache line to be replaced, the microprocessor writes the entire replaced line to memory.

The conventional approach is to treat the prefetched cache line as an ordinary line fill. An ordinary line fill is a fetch of a cache line from system memory because an instruction accessed data in the cache line. With an ordinary line fill, the fetched cache line is unconditionally written, or retired, into the cache. A disadvantage of unconditionally retiring a speculatively prefetched cache line into the cache is that it potentially replaces a line in the cache that is currently being used or likely to be used in the near future, thereby potentially adversely affecting cache efficiency. A solution to this problem is needed in order to improve cache efficiency.

SUMMARY OF THE INVENTION

The present invention distinguishes a prefetched cache line from an ordinary cache line fill and selectively retires the prefetched cache line into the cache based upon contemporaneous accesses to the prefetched cache line in a first embodiment. In a second embodiment, the prefetched cache line is selectively retired based upon contemporaneous accesses to the line in the cache that is the candidate for being replaced by the prefetched line. Accordingly, in attainment of the aforementioned object, it is a feature of the present invention to provide a microprocessor. The microprocessor includes a cache memory, having an index input for selecting a set of at least one cache line among a plurality of sets selectable by the index within the cache memory. The microprocessor also includes a prefetch buffer, coupled to the cache memory, for receiving a prefetched cache line from a system memory. The prefetch buffer is shared globally by the plurality of sets of the cache memory independent of the index. The microprocessor also includes control logic, coupled to the prefetch buffer, for selectively retiring the prefetched cache line into the cache memory based on accesses to the prefetched cache line contemporaneous with prefetching the prefetched cache line into the prefetch buffer.

In another aspect, it is a feature of the present invention to provide an apparatus in a microprocessor for selectively retiring a prefetched cache line into a cache memory of the microprocessor. The apparatus includes a prefetch buffer, for storing the prefetched cache line. The apparatus also includes a counter, coupled to the prefetch buffer, for storing a count of accesses to a replacement candidate line in the cache. The apparatus also includes control logic, coupled to the counter, for selectively retiring the prefetched cache line to the cache based on the count in the counter.

In another aspect, it is a feature of the present invention to provide a method for selectively retiring a prefetched cache line from a prefetch buffer to a cache in a microprocessor. The method includes prefetching the prefetched cache line into the prefetch buffer in response to a miss in the cache. The method also includes receiving a request to prefetch a new cache line into the prefetch buffer. The method also includes determining whether a replacement candidate line in the cache is invalid. The method also includes replacing the replacement candidate line in the cache with the prefetched cache line if the replacement candidate line is invalid.

An advantage of the present invention is that by adding a small amount of additional hardware we are able to potentially improve cache efficiency by decreasing the likelihood of detrimentally replacing a cache line that is more likely to be accessed in the near future than the prefetched line.

DETAILED DESCRIPTION

Figure 1:
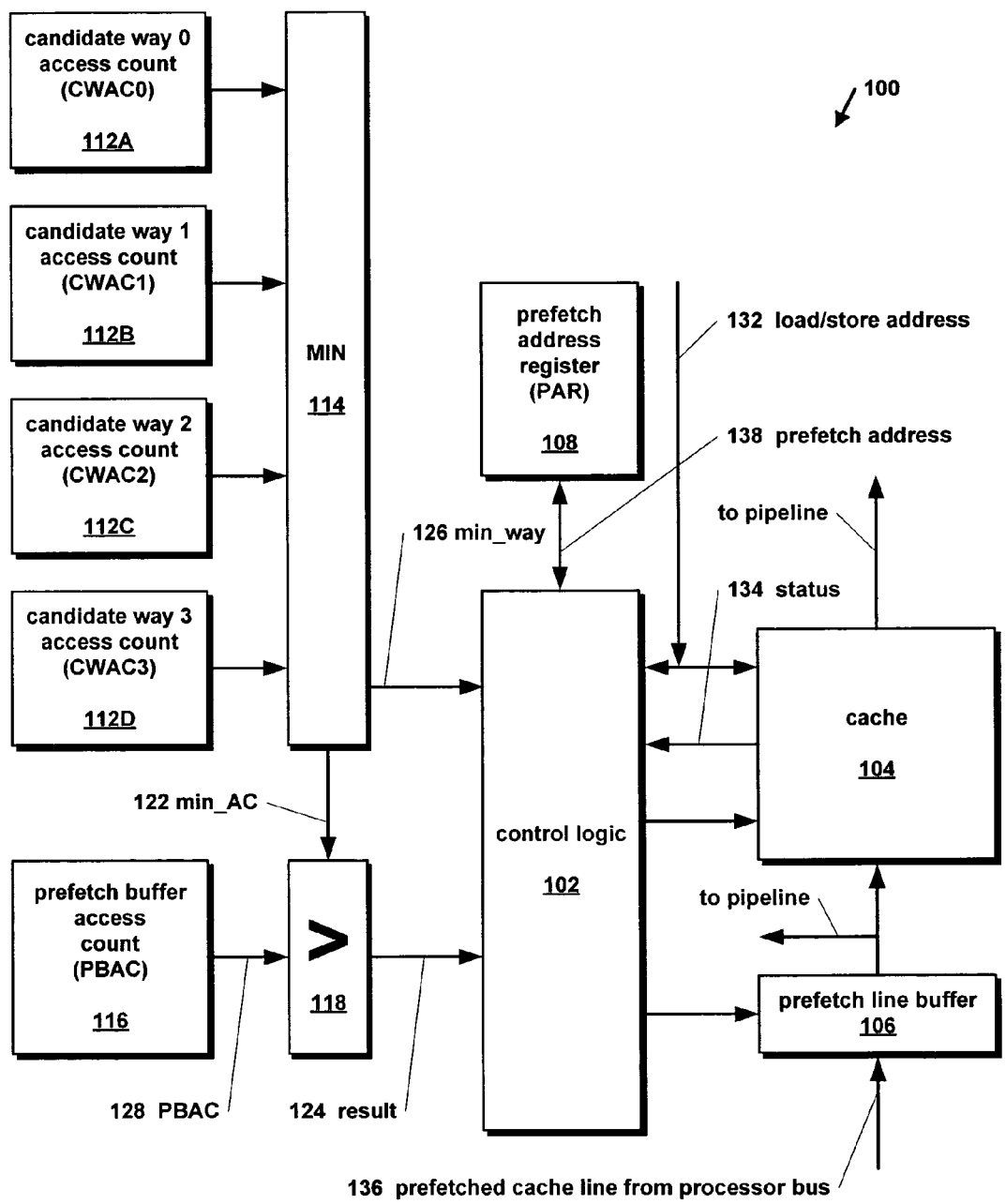
FIG. 1 is a block diagram of a microprocessor with an apparatus for selectively retiring prefetched cache lines according to the present invention.

Referring now to FIG. 1, a block diagram of a microprocessor 100 with an apparatus for selectively retiring prefetched cache lines according to the present invention is shown. Microprocessor 100 includes a plurality of stages coupled together to form a pipeline. One or more of the pipeline stages includes an address generator for generating a memory access operation address, referred to in FIG. 1 as load/store address 132. The load/store address 132 specifies the address of a load or store operation. A load operation reads data from memory into microprocessor 100, and a store operation writes data from microprocessor 100 to memory. In one embodiment, load/store address 132 is a physical memory address.

Microprocessor 100 also includes a cache memory 104, or cache 104. In one embodiment, cache 104 comprises a 64 KB 4-way set associative cache memory. In one embodiment, cache 104 is a level-1 data cache; however, the present invention is not limited to use with a data cache, but may be employed with an instruction cache or with a unified data/instruction cache. Additionally, the present invention is not limited to application with a level-1 cache, but may be employed with caches at any level of the cache hierarchy.

Cache 104 stores address tags and status of each cache line stored therein. The tags comprise an upper portion of the memory address of cache lines stored in cache 104. In one embodiment, the status comprises MESI (Modified/Exclusive/Shared/Invalid) protocol state information. Cache 104 receives load/store address 132. A lower portion of load/store address 132 is used to index into cache 104 to select a set, or row, of ways. Cache 104 compares the upper portion of load/store address 132 with the address tags of each way in the selected set so a determination may be made of whether load/store address 132 hits in the cache, i.e., whether load/store address 132 matches any tags present in cache 104 and has a valid status. Cache 104 outputs status information 134, which includes the MESI state of each way of the selected set, and an indication of whether any of the tags in the selected set match load/store address 132. If load/store address 132 is for a load operation causing a hit in cache 104, the hitting cache line data is provided to the stage of the microprocessor 100 pipeline requesting the cache line data.

Microprocessor 100 also includes control logic 102, coupled to cache 104. Control logic 102 receives status 134 from cache 104 and load/store address 132. Control logic 102 responsively generates control signals to control the operation of cache 104. Operation of control logic 102 will be described in more detail below.

Microprocessor 100 also includes a prefetch line buffer 106, coupled to cache 104. Prefetch buffer 106 receives a prefetched cache line 136 from a bus interface unit, which fetches data from a system memory into microprocessor 100 over a processor bus. As described below, if load/store address 132 misses in cache 104, control logic 102 causes a cache line following the cache line implicated by load/store address 132, i.e., prefetched cache line 136, to be prefetched from system memory into prefetch buffer 106. Advantageously, control logic 102 selectively retires the prefetched cache line 136 into cache 104 based on contemporaneous accesses to the prefetched cache line 136, as described below.

Prefetch buffer 106 provides the prefetched cache line 136 to cache 104. Additionally, prefetch buffer 106 provides the prefetched cache line 136 to one or more stages of the microprocessor 100 pipeline requesting data in the prefetched cache line 136. In this regard, prefetch line buffer 106 may be viewed as an extension of cache 104. That is, if control logic 102 determines that a load operation specifies a load/store address 132 that misses in cache 104 but hits in prefetch buffer 106, control logic 102 may provide data from the prefetched cache line 136 to a microprocessor 100 pipeline stage.

Microprocessor 100 also includes a prefetch address register (PAR) 108, coupled to control logic 102. PAR 108 stores the address of the prefetched cache line 136 stored in prefetch buffer 106, referred to as prefetch address 138. When control logic 102 causes the prefetched cache line 136 to be prefetched into prefetch buffer 106, control logic 102 updates PAR 108 with the prefetched cache line address 138. Additionally, control logic 102 compares PAR 108 with load/store address 132 to detect subsequent accesses to the prefetched cache line 136.

Microprocessor 100 also includes a prefetch buffer access count (PBAC) register 116, coupled to control logic 102. PBAC register 116 stores the number of accesses to the prefetched cache line 136 in prefetch buffer 106, referred to as PBAC 128. Control logic 102 increments PBAC register 116 when control logic 102 detects an access to the prefetched cache line 136. In one embodiment, an access includes a read of the prefetched cache line 136. However, other embodiments are contemplated in which accesses to the prefetched cache line 136 also include writes and/or snoop operations. Control logic 102 clears PBAC register 116 when a new prefetched cache line 136 is prefetched into prefetch buffer 106.

Microprocessor 100 also includes a plurality of candidate way access count (CWAC) registers 112, coupled to control logic 102. The embodiment of FIG. 1 includes four CWAC registers 112, denoted CWAC0 112A, CWAC1 112B, CWAC2 112C, and CWAC3 112D, corresponding to each of the four ways in 4-way set associative cache 104. Each of the CWAC registers 112 stores the number of accesses to the corresponding way of the candidate set. The candidate set is the set of ways in cache 104 selected by prefetch address 138. Control logic 102 increments one of the CWAC registers 112 when control logic 102 detects an access to the corresponding way of the selected set in cache 104. Control logic 102 clears the CWAC registers 112 when a new prefetched cache line 136 is prefetched into prefetch buffer 106.

Microprocessor 100 also includes minimum selection logic 114, coupled to CWAC registers 112. Minimum selection logic 114 receives the CWAC from each of the CWAC registers 112 and outputs the smallest value received from the CWAC registers 112, denoted min_AC 122. In addition, minimum selection logic 114 outputs to control logic 102 min_way signal 126, which specifies the way number hav ing the smallest value received from the CWAC registers 112.

Microprocessor 100 also includes a comparator 118, coupled to minimum selection logic 114 and PBAC register 116. Comparator 118 compares min_AC 122 and PBAC 128, and generates a true value on result output 124 if PBAC 128 is greater than min_AC 122, and generates a false value otherwise. In another embodiment, comparator 118 compares min_AC 122 and PBAC 128, and generates a true value on result output 124 if PBAC 128 is greater than or equal to min_AC 122, and generates a false value otherwise. Result 124 is provided to control logic 102.

Figure 2:
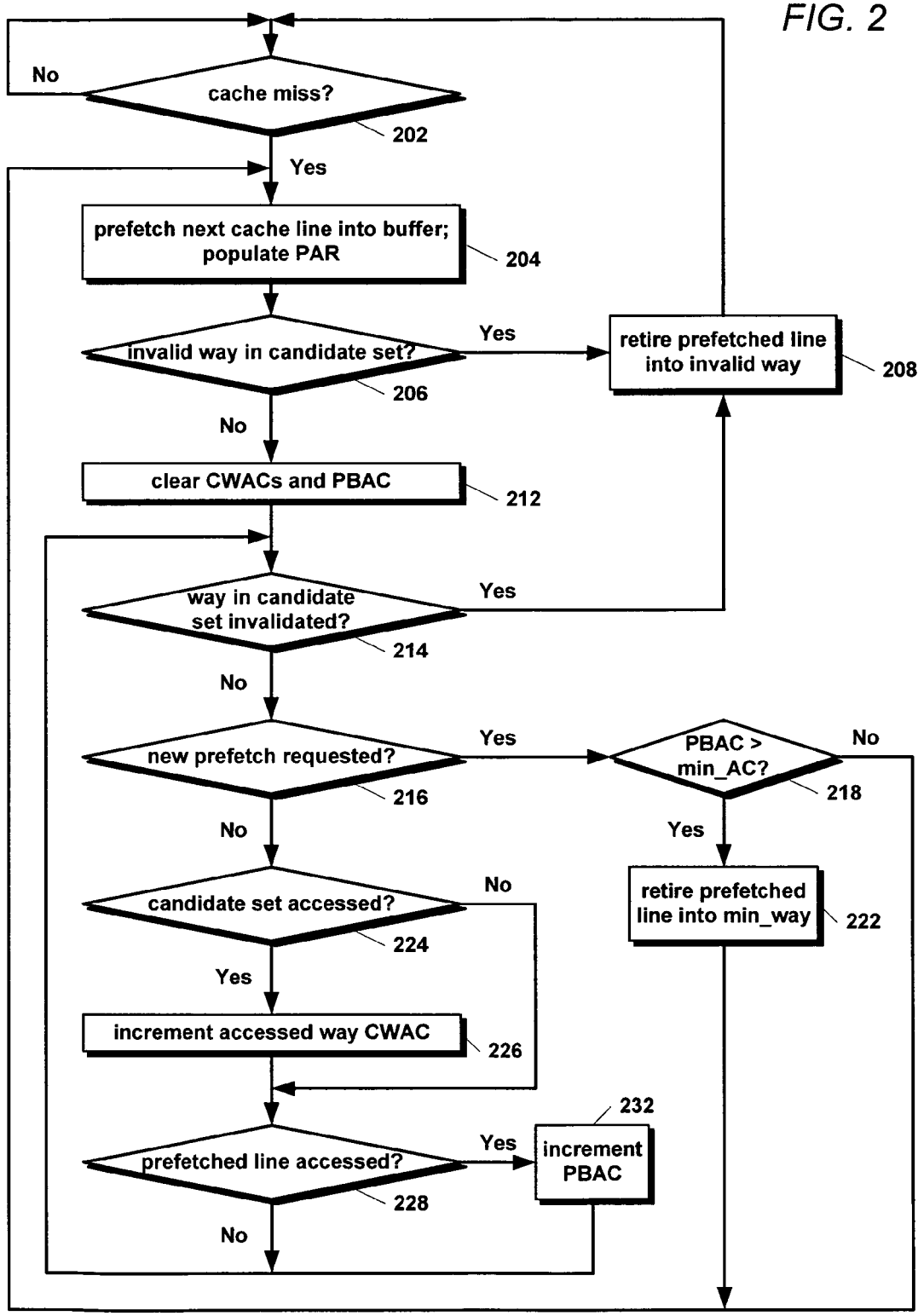
FIG. 2 is a flowchart illustrating operation of the microprocessor of FIG. 1 to selectively retire a prefetched cache line from the prefetch buffer into the cache according to the present invention.

Referring now to FIG. 2, a flowchart illustrating operation of microprocessor 100 of FIG. 1 to selectively retire a prefetched cache line from prefetch buffer 106 into cache 104 is shown. Flow begins at decision block 202.

At decision block 202, control logic 102 determines whether load/store address 132 misses in cache 104 by examining status signals 134 of FIG. 1. If so, flow proceeds from decision block 202 to block 204; otherwise, flow returns to decision block 202.

At block 204, after initiating a fetch of the missing cache line from memory into cache 104, control logic 102 instructs the bus interface unit to prefetch the next cache line after the cache line implicated by missing load/store address 132 into prefetch buffer 106 of FIG. 1. Before prefetching the next cache line into prefetch buffer 106, control logic 102 verifies that the next cache line is also missing in cache 104. When the prefetched cache line 136 has been prefetched into prefetch buffer 106, control logic 102 updates prefetch address register 108 with prefetch address 138 of FIG. 1, i.e., the address of the next cache line. Flow proceeds from block 204 to decision block 206.

At decision block 206, control logic 102 queries cache 104 with prefetch address 138 and determines whether any of the ways in the candidate set is invalid by examining status information 134 of FIG. 1. If so, flow proceeds from decision block 206 to block 208; otherwise, flow proceeds to block 212.

At block 208, control logic 102 retires the prefetched cache line 136 into the invalid way of the candidate set of cache 104. Flow returns from block 208 to decision block 202.

At block 212, control logic 102 clears to zero PBAC register 116 and CWAC registers 112 of FIG. 1. Flow proceeds from block 212 to decision block 214.

At decision block 214, as load/store operations access cache 104, control logic 102 determines whether any of the operations have invalidated any of the ways in the candidate set. For example, a way in the candidate set may be invalidated by an invalidating snoop access. If any of the ways in the candidate set have been invalidated, flow proceeds from decision block 214 to block 208; otherwise, flow proceeds to decision block 216.

At decision block 216, control logic 102 determines whether a new prefetch request has been made. That is, control logic 102 determines whether a new load/store address 132 has missed in cache 104 causing prefetch buffer 106 to be needed for prefetching a new cache line. If so, flow proceeds from decision block 216 to decision block 218; otherwise, flow proceeds to decision block 224.

At decision block 218, control logic 102 determines whether PBAC 128 is greater than min_AC 122 by examining result signal 124 of FIG. 1. If so, flow proceeds from decision block 218 to block 222. Otherwise, flow proceeds to block 204 such that the prefetched cache line 136 stored in prefetch buffer 106 is not retired into cache 104, but instead is discarded, i.e., subsequently overwritten by the new prefetched cache line.

At block 222, control logic 102 retires the prefetched cache line 136 into the way of the candidate set of cache 104 specified by min_way signal 126. Flow proceeds from block 222 to block 204.

At decision block 224, control logic 102 determines whether a way in the candidate set has been accessed by examining status information 134. In one embodiment, a way is accessed if load/store address 132 hits in cache 104, i.e., if the way has valid status and the tag of the way matches the tag portion of load/store address 132. If the candidate set has been accessed, flow proceeds from decision block 224 to block 226; otherwise flow proceeds to decision block 228.

At block 226, control logic 102 increments the CWAC register 112 corresponding to the accessed way determined at decision block 224. For example, if way 2 is accessed, then control logic 102 increments CWAC2 112C. Flow proceeds from block 226 to decision block 228.

At decision block 228, control logic 102 determines whether the prefetched cache line 136 has been accessed by comparing prefetch address 138 with load/store address 132. If so, flow proceeds from decision block 228 to block 232; otherwise flow proceeds to decision block 214.

At block 232, control logic 102 increments PBAC register 116. Flow proceeds from block 232 to decision block 214.

The pseudocode shown in Table 1 below also describes the operation of microprocessor 100 described in FIG. 2.

TABLE 1

```
if ( anyWayInCandidateSetInvalid ) {
    retirePrefetchedLineToCache( );
} else {
    PBAC = CWAC[0] = CWAC[1] = CWAC[2] = CWAC[3] = 0;
    while ( noNewPrefetchRequested &&
    noWayInCandidateSetInvalidated ) {
        if ( candidateSetAccessed )
            CWAC[accessedWay]++;
        if ( PrefetchedLineAccessed )
            PBAC++;
    }
    if (newPrefetchRequested ) {
        if ( PBAC > min_AC )
            RetirePrefetchedLineToCache( );
        else   /* throw away prefetched cache line */
            OverwritePrefetchBufferWithNewPrefetchData( );
    } else {       /* way in candidate set was invalidated */
        RetirePrefetchedLineToCache( );
    }
}
```

As may be observed from FIGS. 1 and 2, the present invention advantageously selectively retires the prefetched cache line 136 into cache 104, based on the number of times the prefetched cache line 136 is accessed relative to the number of times the ways of the candidate set is accessed, rather than indiscriminately retiring the prefetched cache line 136 into cache 104.

Figure 3:
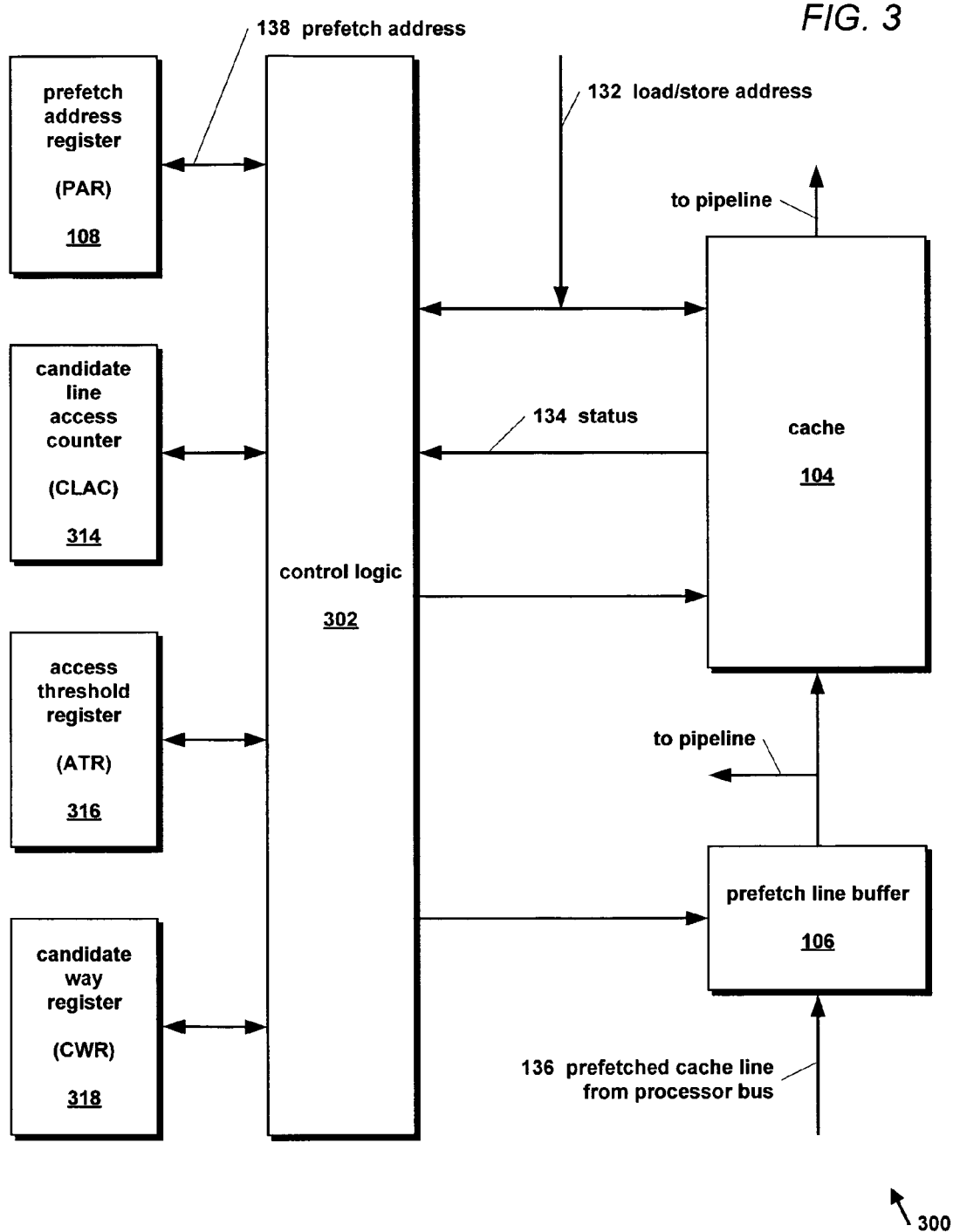
FIG. 3 is a block diagram of a microprocessor with an apparatus for selectively retiring prefetched cache lines according to an alternate embodiment of the present invention.

Referring now to FIG. 3, a block diagram of a microprocessor 300 with an apparatus for selectively retiring prefetched cache lines according to an alternate embodiment of the present invention is shown.

Microprocessor 300 includes a cache 104, prefetch buffer 106, prefetch address register (PAR) 108, load/store address 132, status information 134, prefetched cache line 136, and prefetch address 138 similar to like-numbered items of FIG. 1.

Microprocessor 300 also includes control logic 302 similar to control logic 102 of FIG. 1 and similarly coupled to cache 104 and prefetch buffer 106; however, control logic 302 of FIG. 3 operates to selectively retire prefetched cache line 136 into cache 104 based on values stored in a candidate line access counter (CLAC) register 314, an access threshold register (ATR) 316, and a candidate way register (CWR) 318, all coupled to control logic 302.

CWR 318 stores a value specifying the candidate way, which is the way of the candidate set to be selectively replaced by prefetched cache line 136. In one embodiment, initially, control logic 302 populates CWR 318 with the least-recently-used way of the candidate set determined from status information 134. If the candidate way is replaced before a new prefetch is requested, control logic 302 updates CWR 318 with the new least-recently-used way.

CLAC 314 stores a count of the number of times the candidate line, or candidate way, specified in CWR 318 has been accessed since prefetched cache line 136 was prefetched into prefetch buffer 106.

ATR 316 stores a threshold value used by control logic 302 to compare with the value stored in CLAC 314 to selectively retire the prefetched cache line 136, as described below. In one embodiment, the value stored in ATR 316 is predetermined. In one embodiment, the value stored in ATR 316 is programmable.

Figure 4:
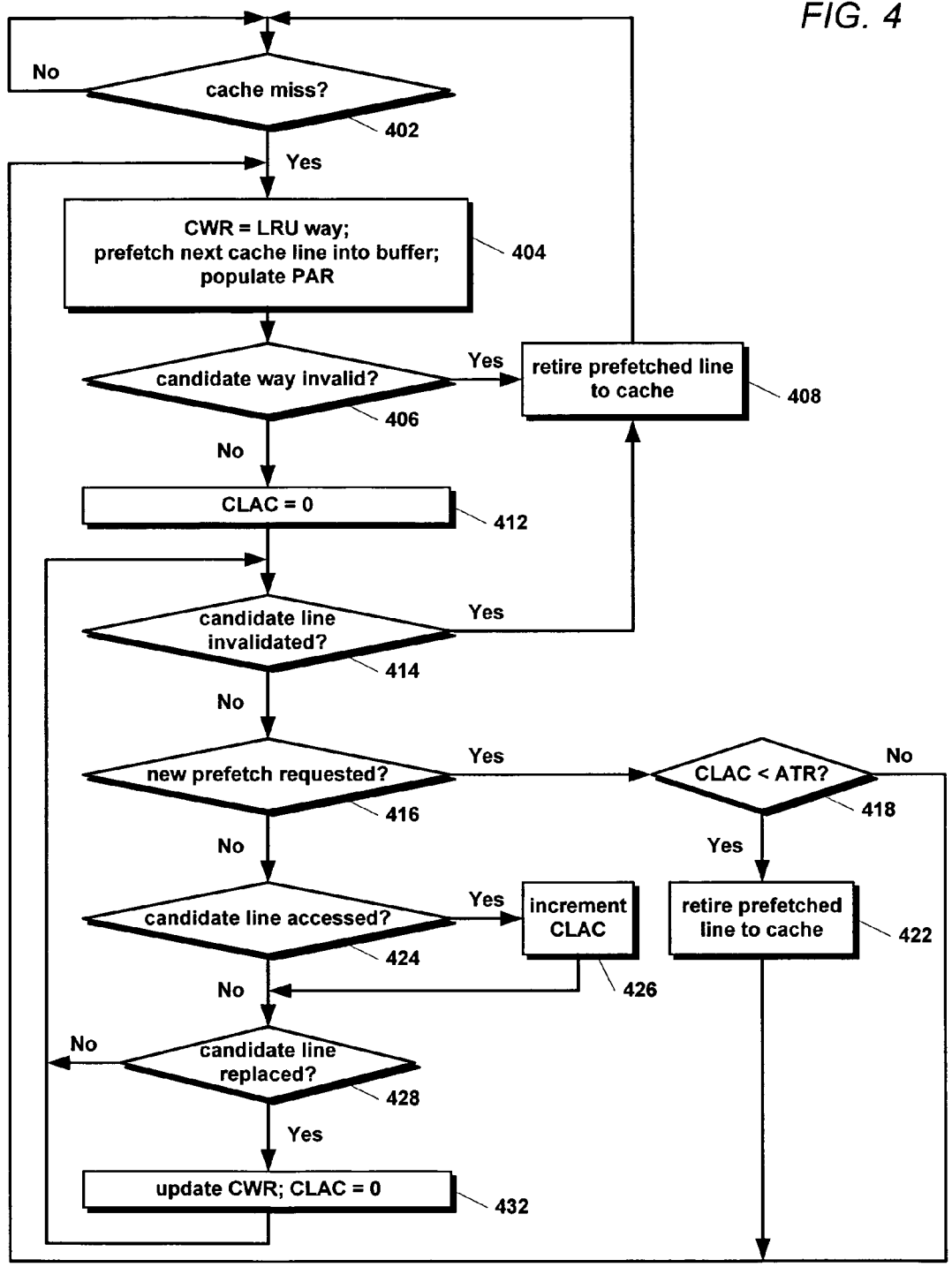
FIG. 4 is a flowchart illustrating operation of the microprocessor of FIG. 3 to selectively retire a prefetched cache line from the prefetch buffer into the cache according to an alternate embodiment of the present invention.

Referring now to FIG. 4, a flowchart illustrating operation of microprocessor 300 of FIG. 3 to selectively retire a prefetched cache line from prefetch buffer 106 into cache 104 is shown. Flow begins at decision block 402.

At block 402, control logic 302 determines whether load/store address 132 misses in cache 104 by examining status signals 134 of FIG. 3. If so, flow proceeds from decision block 402 to block 404; otherwise, flow returns to decision block 402.

At block 404, after initiating a fetch of the missing cache line from memory into cache 104, control logic 302 populates CWR 318 with a value specifying the least-recently-used way of the candidate line. Furthermore, control logic 302 instructs the bus interface unit to prefetch the next cache line after the cache line implicated by missing load/store address 132 into prefetch buffer 106 of FIG. 1. Before prefetching the next cache line into prefetch buffer 106, control logic 102 verifies that the next cache line is also missing in cache 104. Additionally, control logic 302 populates prefetch address register 108 with the address of the next cache line after the missing cache line. Flow proceeds from block 404 to decision block 406.

At decision block 406, control logic 302 queries cache 104 with prefetch address 138 and determines whether any of the ways in the candidate set is invalid by examining status information 134 of FIG. 3. If so, flow proceeds from decision block 406 to block 408; otherwise, flow proceeds to block 412.

At block 408, control logic 302 retires the prefetched cache line 136 into the candidate way of cache 104 specified in CWR 318. Flow returns from block 408 to decision block 402.

At block 412, control logic 302 clears to zero CLAC 314 of FIG. 3. Flow proceeds from block 412 to decision block 414.

At decision block 414, as load/store operations access cache 104, control logic 302 determines whether any of the operations have invalidated the candidate way. If so, flow proceeds from decision block 414 to block 408; otherwise, flow proceeds to decision block 416.

At decision block 416, control logic 302 determines whether a new prefetch request has been made. If so, flow proceeds from decision block 416 to decision block 418; otherwise, flow proceeds to decision block 424.

At decision block 418, control logic 302 determines whether the value stored in CLAC 314 is greater than the value stored in ATR 316 of FIG. 3. If so, flow proceeds from decision block 418 to block 422. Otherwise, flow proceeds to block 404 such that the prefetched cache line 136 stored in prefetch buffer 106 is not retired into cache 104, but instead is discarded, i.e., subsequently overwritten by the new prefetched cache line.

At block 422, control logic 302 retires the prefetched cache line 136 into the candidate way of cache 104 specified by CWR 318. Flow proceeds from block 422 to block 404.

At decision block 424, control logic 302 determines whether the candidate way has been accessed by examining status information 134. In one embodiment, the candidate way is accessed if the candidate way has valid status and the tag of the way matches the tag portion of load/store address 132. If so, flow proceeds from decision block 424 to block 426; otherwise flow proceeds to decision block 428.

At block 426, control logic 302 increments the CLAC 314. Flow proceeds from block 426 to decision block 428.

At decision block 428, control logic 302 determines whether the candidate way has been replaced by a store operation. If so, flow proceeds from decision block 428 to block 432; otherwise flow proceeds to decision block 414.

At block 432, control logic 302 updates CWR 318 with the new least-recently-used way in the candidate set and clears to zero CLAC 314. Flow proceeds from block 432 to decision block 414.

The pseudocode shown in Table 2 below also describes the operation of microprocessor 300 described in FIG. 4.

TABLE 2

```
if ( Cache[PrefetchIndex][CandidateWay].Valid == 0 ) {
    RetirePrefetchToCache( );
} else {
    CandidateLineAccessCount = 0;
    while ( ! NewPrefetchRequest && ! CandidateLineInvalidated ) {
        if ( CandidateLineAccessed ) {
            CandidateLineAccessCount++;
        } else if (CandidateLineInvalidated ) {
        /* e.g., by external snoop */
            RetirePrefetchToCache( );
        } else if (CandidateLineReplaced ) {
        /* i.e., with valid miss data */
            UpdateCandidateWayRegister( );
            CandidateLineAccessCount = 0;
        }
    }
    if ( ( CandidateLineAccessCount < AccessThreshold ) &&
            ( ! CandidateLineInvalidated) )
    {
        RetirePrefetchToCache( );
    } else {
        OverWritePrefetchBufferWithNewPrefetchData( );
        /* i.e., flush old prefetch data */
    }
}
```

Although the present invention and its objects, features, and advantages have been described in detail, other embodiments are encompassed by the invention. For example, the present invention is suitable for use with a data cache or an instruction cache or a combined instruction/data cache. Furthermore, although an embodiment has been described in which accesses to the prefetched cache line and replacement candidate lines are tracked after the prefetched line is fetched into the prefetch buffer, other contemporaneous accesses may be tracked and used as a basis for selectively retiring the prefetched cache line, such as including accesses to candidate lines and/or the prefetched line between the time the need to prefetch is identified and the time the prefetched line arrives in the prefetch buffer. Additionally, reads, writes, snoops, and various access combinations thereof may be tracked for use in selectively retiring the prefetched cache line. That is, various heuristics may be embodied to determine whether the prefetched cache line or a replacement candidate line in the cache has a higher probability of being accessed in the future, which is more advantageous than the conventional method of unconditionally retiring the prefetched cache line into the cache. Finally, although the invention has been described with respect to prefetches generated by a miss of the cache, the invention is adaptable to use with any type of prefetch, such as a prefetch generated by a prefetch program instruction.

In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A microprocessor, comprising:
   a cache memory, having a plurality of sets each configured to store at least one cache line;
   a prefetch buffer, coupled to said cache memory, for receiving a prefetched cache line from a system memory, wherein said prefetch buffer is unassociated with any particular one of said plurality of sets of said cache memory, but rather said prefetched cache line may be selectively retired from said prefetch buffer to any of said plurality of sets depending upon a memory address of said prefetched cache line;
   a prefetch address register, configured to store said memory address of said prefetched cache line stored in said prefetch buffer; and
   control logic, coupled to said prefetch buffer, for selectively retiring said prefetched cache line into a candidate set of said plurality of sets of said cache memory based on accesses to said prefetched cache line contemporaneous with prefetching said prefetched cache line into said prefetch buffer, wherein said candidate set is one of said plurality of sets selected by said memory address of said prefetched cache line.

2. The microprocessor of claim 1, wherein said control logic selectively retires said prefetched cache line into said cache memory in response to a subsequent request to prefetch another cache line into said prefetch buffer.

3. The microprocessor of claim 1, further comprising:
   a counter, coupled to said control logic, for counting a number of times said prefetched cache line in said prefetch buffer is accessed.

4. The microprocessor of claim 3, wherein said control logic selectively retires said prefetched cache line into said cache memory based on said accesses to said prefetched cache line indicated by said number stored in said counter.

5. The microprocessor of claim 4, wherein said cache memory comprises an N-way set associative cache memory.

6. The microprocessor of claim 5, further comprising:
   an address input to said N-way set associative cache memory, for selecting an N-way set in said cache memory.

7. The microprocessor of claim 6, further comprising:
   N counters, coupled to said control logic, each for counting a number of times a corresponding one of said N ways of said selected set is accessed after said prefetched cache line is prefetched.

8. The microprocessor of claim 7, wherein said control logic selectively retires said prefetched cache line into said cache memory based on said number stored in said counter relative to said numbers stored in said N counters.

9. The microprocessor of claim 8, wherein said control logic selectively retires said prefetched cache line into said cache memory in response to a subsequent request to prefetch another cache line into said prefetch buffer.

10. The microprocessor of claim 8, further comprising:
    selection logic, coupled to said N counters, for selecting a smallest of said number of accesses stored in said N counters.

11. The microprocessor of claim 10, wherein said control logic retires said prefetched cache line into said cache memory if said number stored in said counter is greater than said smallest number of accesses selected by said selection logic.

12. The microprocessor of claim 11, wherein said control logic discards said prefetched cache line if said number stored in said counter is not greater than said smallest number of accesses selected by said selection logic.

13. The microprocessor of claim 12, wherein said selection logic also specifies one of said N ways associated with said N counters storing said smallest of said number of accesses.

14. The microprocessor of claim 13, wherein said control logic retires said prefetched cache line into said cache memory into said specified one of said N ways associated with said N counters storing said smallest of said number of accesses.

15. The microprocessor of claim 10, wherein said control logic retires said prefetched cache line into said cache memory if said number stored in said counter is greater than or equal to said smallest number of accesses selected by said selection logic.

16. The microprocessor of claim 15, wherein said control logic discards said prefetched cache line if said number stored in said counter is not greater than or equal to said smallest number of accesses selected by said selection logic.

17. The microprocessor of claim 16, wherein said selection logic also specifies one of said N ways associated with said N counters storing said smallest of said number of accesses.

18. The microprocessor of claim 17, wherein said control logic retires said prefetched cache line into said cache memory into said specified one of said N ways associated with said N counters storing said smallest of said number of accesses.

19. The microprocessor of claim 5, wherein said control logic retires said prefetched cache line into said cache memory in response to invalidation of one of said N ways of said selected set.

20. The microprocessor of claim 19, wherein said control logic retires said prefetched cache line into said cache memory into said invalidated of one of said N ways of said selected set.

21. The microprocessor of claim 5, wherein said N is 1.

22. The microprocessor of claim 5, wherein said N is greater than 1.

23. The microprocessor of claim 1, further comprising:
a register, coupled to said control logic, for storing an address of said prefetched cache line.

24. The microprocessor of claim 1, wherein said prefetched cache line is prefetched from said system memory in response to a miss of an address in said cache memory.

25. The microprocessor of claim 24, wherein said prefetched cache line follows a cache line implicated by said address missing in said cache memory.

26. The microprocessor of claim 1, wherein said control logic retires said prefetched cache line into said cache memory if said prefetched cache line is contemporaneously accessed at least as frequently as one or more candidate replacement cache lines in said cache memory.

27. The microprocessor of claim 1, wherein said control logic retires said prefetched cache line into said cache memory if said prefetched cache line is accessed prior to generation of a new prefetch request of another cache line into said prefetch buffer.

28. A method for selectively retiring a prefetched cache line from a prefetch buffer to a cache memory in a microprocessor, the cache memory having a plurality of sets, the method comprising:
prefetching a cache line from a system memory into a prefetch buffer, wherein the prefetch buffer is unassociated with any particular one of said plurality of sets of said cache memory, but rather said prefetched cache line may be selectively retired from said prefetch buffer to any of said plurality of sets depending upon a memory address of said prefetched cache line;
storing a memory address of the prefetched cache line into a register;
selecting a candidate set of the plurality of sets of the cache memory with the memory address of the prefetched cache line;
counting a number of times the prefetched cache line in the prefetch buffer is accessed; and
selectively retiring the prefetched cache line into the candidate set of the plurality of sets of the cache memory based on the number of times the prefetched cache line is accessed contemporaneous with said prefetching the prefetched cache line into the prefetch buffer.

29. The method of claim 28, further comprising:
receiving a request to prefetch another cache line into the prefetch buffer, subsequent to said prefetching;
wherein said selectively retiring is performed in response to said receiving the request to prefetch another cache line into the prefetch buffer.

30. The method of claim 28, wherein the cache memory comprises an N-way set associative cache memory, wherein each of the plurality of sets of the cache memory comprises an N-way set having N cache lines, the method further comprising:
counting a number of times each of the N ways of a set of the plurality of sets is accessed after said prefetching the cache line into the prefetch buffer, wherein the set of the plurality of sets is the set whose index value is the same as the index portion of the prefetched cache line in the prefetch buffer.

31. The method of claim 30, wherein said selectively retiring the prefetched cache line comprises:
selectively retiring the prefetched cache line into the cache memory based on the number of times the prefetched cache line is accessed contemporaneous with said prefetching the prefetched cache line into the prefetch buffer relative to the number of times each of the N ways of the set of the plurality of sets is accessed after said prefetching the cache line into the prefetch buffer.

32. The method of claim 31, wherein said selectively retiring based on the number of times the prefetched cache line is accessed relative to the number of times each of the N ways of the set of the plurality of sets is accessed comprises:
retiring the prefetched cache line into the cache memory if the number of times the prefetched cache line is accessed contemporaneous with said prefetching the prefetched cache line into the prefetch buffer is greater than the smallest number of times the N ways of the set of the plurality of sets is accessed after said prefetching the cache line into the prefetch buffer.

33. The method of claim 32, further comprising:
discarding the prefetched cache line if the number of times the prefetched cache line is accessed contemporaneous with said prefetching the prefetched cache line into the prefetch buffer is not greater than the smallest number of times the N ways of the set of the plurality of sets is accessed after said prefetching the cache line into the prefetch buffer.

34. The method of claim 30, further comprising:
invalidating one of the N ways of the set of the plurality of sets, after said prefetching; and
retiring the prefetched cache line into the cache memory in response to said invalidating.

35. A computer program product embodied on a computer-readable storage medium for use with a computing device, comprising:
a computer-readable storage medium, having computer-readable program code embodied in said medium for providing a microprocessor, said program code comprising:
first program code for providing a cache memory, having a plurality of sets each configured to store at least one cache line;
second program code for providing a prefetch buffer, coupled to said cache memory, for receiving a prefetched cache line from a system memory, wherein said prefetch buffer is unassociated with any particular one of said plurality of sets of said cache memory, but rather said prefetched cache line may be selectively retired from said prefetch buffer to any of said plurality of sets depending upon a memory address of said prefetched cache line;

third program code for providing a prefetch address register, configured to store a memory address of said prefetched cache line stored in said prefetch buffer; and fourth program code for providing control logic, coupled to said prefetch buffer, for selectively retiring said prefetched cache line into a candidate set of said plurality of sets of said cache memory based on accesses to said prefetched cache line contemporaneous with prefetching said prefetched cache line into said prefetch buffer, wherein said candidate set is one of said plurality of sets selected by said memory address of said prefetched cache line.

36. The computer program product of claim 35, further comprising:

fifth program code for providing a counter, coupled to said control logic, for counting a number of times said prefetched cache line in said prefetch buffer is accessed, wherein said control logic is configured to selectively retire said prefetched cache line into said cache memory based on said accesses to said prefetched cache line indicated by said number stored in said counter.

* * * * *

UNITED STATES PATENT AND TRADEMARK OFFICE
CERTIFICATE OF CORRECTION

| | | |
|---|---|---|
| PATENT NO. | : 7,240,163 B2 | Page 1 of 1 |
| APPLICATION NO. | : 11/198988 | |
| DATED | : July 3, 2007 | |
| INVENTOR(S) | : G. Glenn Henry and Rodney E. Hooker | |

It is certified that error appears in the above-identified patent and that said Letters Patent is hereby corrected as shown below:

On the Title Page, Item (63)
Replace the section PRIORITY INFORMATION with the following:

This application is a continuation of Application Ser. No. 10/420,357 filed Apr. 21 2003 now U.S. Pat No. 6,990,558, which claims priority based on U.S. Provisional Application Ser. No. 60/390,054, filed Jun. 18, 2002, entitled METHOD FOR SELECTIVE PREFETCH RETIRE.

Signed and Sealed this

Seventh Day of August, 2007

JON W. DUDAS
*Director of the United States Patent and Trademark Office*